Nov. 10, 1925.
A. L. BAUSMAN
1,561,301
APPARATUS FOR PACKING CONFECTIONS AND THE LIKE
Filed Oct. 19, 1923    2 Sheets-Sheet 2
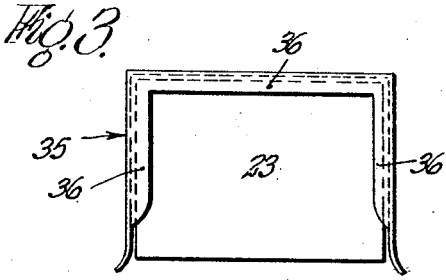
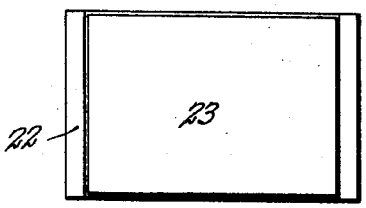
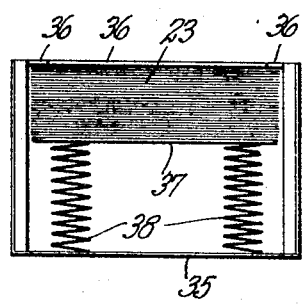
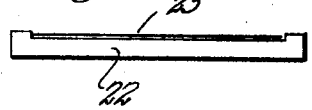
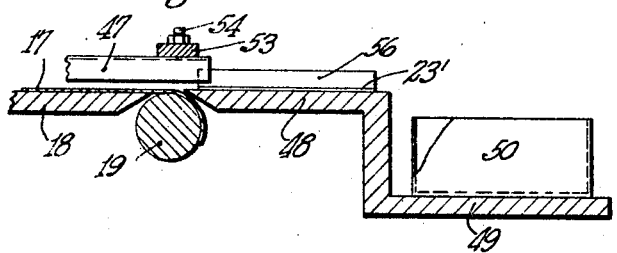
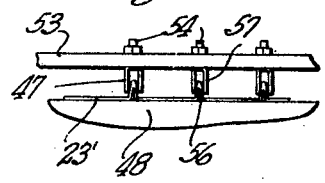
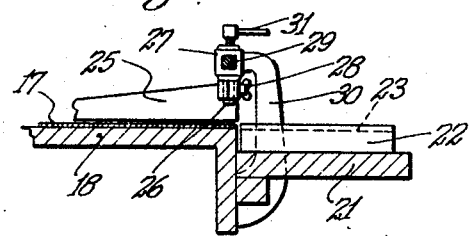
INVENTOR
Alonzo Linton Bausman
BY Chapin & Neal
ATTORNEYS Patented Nov. 10, 1925.

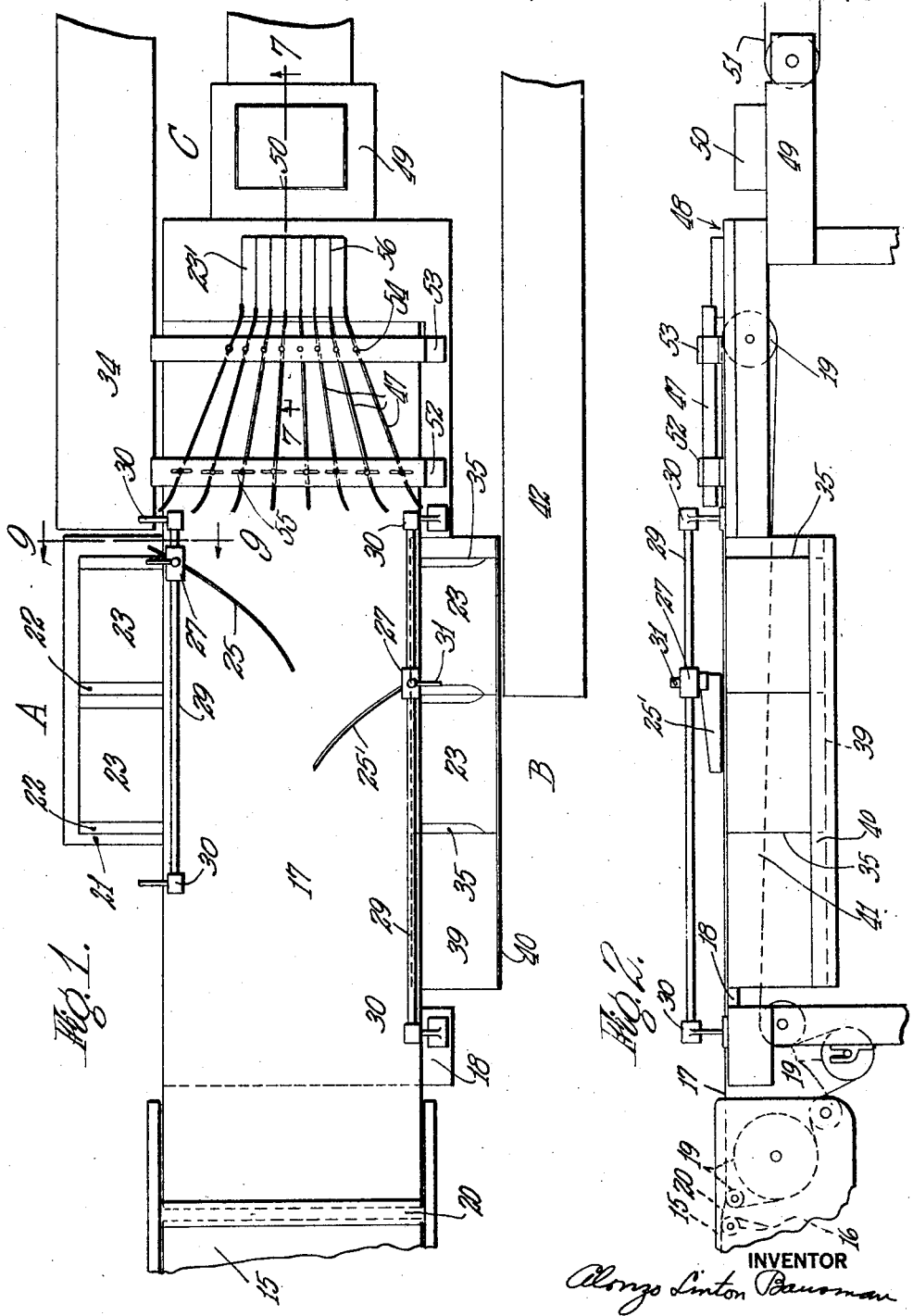

1,561,301

UNITED STATES PATENT OFFICE.

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

APPARATUS FOR PACKING CONFECTIONS AND THE LIKE.

Application filed October 19, 1923. Serial No. 669,542.

*To all whom it may concern:*

Be it known that I, ALONZO LINTON BAUSMAN, a citizen of the United States, residing at Springfield, in the county of Hampden and State of Massachusetts, have invented new and useful Improvements in Apparatus for Packing Confections and the like, of which the following is a specification.

This invention relates to improvements in apparatus for facilitating the packing of confections and the like.

Confections, such for example, as chocolate coated candies, are, after coating, suitably cooled to harden the chocolate coating and then conveyed past packing stations, at which operators select candies from the conveying means and pack them in boxes. A relatively large number of packers are required, according to packing methods now in vogue, to handle the output of a single chocolate coating machine because the operators have to pick the candies from the conveying means one or two at a time and because the candies adhere to the plaques, on which they were placed after the coating operation. The operators thus have the additional work of loosening the candies from the plaques.

The packing operation can be speeded up by providing means to loosen the candies from the plaques and in carrying out this invention, the coated candies are desirably transferred from the chocolate coating machine to a conveyer, which has a suitable surface so that it constitutes one long endless plaque. This conveyer also is desirably used to convey the freshly coated confections through a suitable cooling apparatus and, after the confections have been cooled, they are automatically transferred to another conveyer and during the transfer, the confections are loosened from the first conveyer. The second conveyer then carries the candies past the packing stations and all the candies are loose on the conveyer and free to be rapidly picked up.

While the packing operation can be facilitated by the arrangement just described, this invention is directed to the provision of means which still further lessen the work of the packers. For example, the candies are frequently packed in boxes having two, three or more layers and the layers are separated by cardboards, papers and the like, hereinafter referred to under the generic term "plaque". Instead of picking the candies from the conveyer and inserting them one or two at a time in the box, I propose to load the plaques and then place the loaded plaque in the box and also to provide means whereby the plaques may be loaded with candies very rapidly and with a minimum of manual effort.

This invention has for its broad object to provide in connection with a conveyer for candies, a support adjacent the conveyer on which a plaque may be positioned substantially at the same level as the conveyer and closely adjacent the path of travel thereof, together with deflecting means whereby confections may be diverted to the plaques.

Preferably also, another conveyer is arranged to travel closely adjacent and substantially at the same level as the plaque so that, as soon as the plaque is loaded with candies, it may be easily transferred to the second conveyer and carried to a point where the plaque may be placed in the boxes, although a support for the box may also be arranged adjacent the plaque support so that the operator who assists in loading the plaque may also place the plaques in the boxes, using the second conveyer to carry away the boxes.

According to another feature of the invention, the deflecting means may consist of a series of deflectors so arranged that the candies are diverted from the conveyer in rows upon the plaques. This feature is also useful in packing assorted candies for various kinds of candies can be fed to the coating machine in rows, with a different kind in each row, and the deflectors can be arranged to select from these rows such kinds as are desired and divert them to the plaques.

According to another feature of the invention, there may be provided at each packing station, two or more plaque supporting means with a cooperating deflector and provision is made for relative sliding movement between the supporting means and deflector, so that after the plaque on one means has been loaded, a quick shift may be made to the other without first waiting for the removal of the loaded plaque.

According to another feature of the invention, the plaque supporting means may take the form of a magazine, in which is contained a plurality of plaques mounted in vertically stacked relation and so that the uppermost plaque is always held at the proper level and in such fashion that it may be quickly and conveniently removed when loaded.

Other features of the invention will appear in the following description and in the illustrative embodiment of the invention in the accompanying drawings, in which:—

Fig. 1 is a top plan view of an apparatus embodying the invention;

Fig. 2 is a side elevational view thereof;

Figs. 3 and 4 are top plan and side elevational views, respectively of one of the plaque magazines;

Figs. 5 and 6 are top plan and side elevational views, respectively, of another form of plaque supporting means;

Fig. 7 is a fragmentary sectional view taken on the line 7—7 of Fig. 1;

Fig. 8 is a fragmentary end elevational view of Fig. 7; and

Fig. 9 is a fragmentary cross-sectional view taken on the line 9—9 of Fig. 1.

Referring to these drawings, and particularly to Figs. 1 and 2; 15 represents a conveyer on which the freshly coated candies are delivered from the chocolate coating machine and by which they are carried through the cooling apparatus. At the delivery end of conveyer 15 is a roll 16, around which the conveyer travels in passing from its upper and working stretch to its lower and return stretch. In line with conveyer 15 is a second conveyer 17, which travels over a table 18 and is supported and guided by suitable rolls, such as 19. An inclined plate 20 fills the gap between the adjacent ends of conveyers 15 and 17 and coacts with the conveyer 15 to loosen the confections which adhere thereto and the loosened confections slide down plate 20 onto conveyer 17.

Adjacent the conveyer 17 is a plurality of packing stations and I have found that two or three stations are all that are ordinarily necessary to take care of the entire output of the chocolate coating machine when the improvements of my invention are used. Three such stations are indicated at A, B and C in the drawings. The particular equipment provided at each packing station may vary within considerable limits according to the wishes of the user. Thus, the equipment at station A consists simply of a support, such as a shelf 21 on which one or more, and preferably, at least two, plaque supporting devices are placed, being fixed to the shelf or not, as desired. Each of these devices may consist simply of a tray 22 (Figs. 5 and 6) which is open at opposite ends and is recessed to receive a single plaque 23. The trays, whatever their form, are mounted with one open end facing away from the conveyer 17 so that the loaded plaque may be conveniently withdrawn therefrom, and the other open end of each tray preferably abuts the edge of table 18 so that one edge of plaque 23 and one edge of conveyer 17 will lie in as close proximity as possible.

At each packing station there are provided suitable deflecting means which divert the travelling confections from conveyer 15 to plaques 23. Such means may consist of a single deflector such as that shown at 25 at station A and this deflector may be adjustable with relation to conveyer 17, as by pivotally connecting it at one end by a stud 26 which is fixed to and depends from a supporting bracket 27.

A thumb screw 28 serves to clamp the deflector to a stud 26 in its various positions of adjustment. The deflector is preferably also mounted to slide longitudinally with respect to conveyer 17 and this may be accomplished by mounting bracket 27 on a square rod 29 which is supported at its ends by brackets 30, secured to table 18. A hand screw 31 may be threaded into bracket 27 and brought to bear on rod 29 to releasably hold the bracket 27 in various positions of adjustment, if, and when desired. Generally, the deflector is left free for sliding movement so that, as soon as the right hand plaque 23 at station A has been loaded with confections, the deflector may be quickly removed into proper relation with the left hand plaque. Also, it is often desired to move the deflector during the loading of a plaque. That is, the deflector 25 might first be positioned at the left hand end of plaque 23 and, as soon as one row of candies had been arranged thereon, the deflector can be moved one step to the right until a second row of candies has been arranged on plaque 23. The loaded plaques may be manually transferred to a conveyer 32 which travels adjacent the support 21.

The deflecting means may, however, be stationary and the plaque supports may be slidably mounted and this condition is shown at station B, where the deflector 25' is mounted as described but clamped to rod 29 by screw 31 and the plaque supporting means are slidable. The particular means there shown consist of magazines which support a plurality of plaques and the detailed construction of these magazines is best shown in Figs. 3 and 4. As there shown, the magazine 35 consists of a box like structure, open at the top and one side and having at the top, inturned lips 36 along three sides. The plaques 23 rest upon a follower 37 which is constantly urged upwardly, as by springs 38, the upward movement of the plaques being restrained by the engagement of the uppermost one with the lips 36. Two of these magazines are slidably supported in some suitable manner, as upon a shelf 39, having a flange 40 cooperating with a side rail 41 of table 18 to restrain lateral movement of the magazines. These magazines are mounted so that their open ends face away from conveyer 17 and so that one edge of each plaque 23 lies closely adjacent one edge of conveyer 17. The top of table 18 is preferably cut out to receive the end flange 36 and permit it to underlie conveyer 17 as indicated in Fig. 1. As soon as the plaque 23 in the left hand magazine has been filled, the magazines can be slid rapidly to the left to bring the right hand magazine into proper relation with deflector 25'. Then, the loaded plaque 23 can be pulled out through the open end of the magazine and placed on a conveyer 42 which is mounted to travel adjacent to the magazines. In connection with the magazines 35, the inturned lips 36 assist in properly lining up the goods on the edges of the plaques.

The deflecting means, instead of consisting of a single deflector such as 25 or 25', may consist of a plurality of deflectors, each arranged to take confections from a different part of the conveyer whereby a plurality of rows of confections may be simultaneously diverted to and upon a plaque. This condition is illustrated at station C where a plurality of deflectors 47 are mounted in overlying relation with conveyer 17 near the delivery end thereof. Beyond such end is a support, such as 48, for the plaque and beyond this support may be a second support 49, preferably at a lower level, for a box, such as 50. Travelling adjacent the support 49 is a conveyer 51 on which the loaded plaques or the loaded boxes may be placed and carried away.

The deflectors 47 may be supported in any suitable way and I have shown them as supported in depending relation from a pair of longitudinally spaced cross bars 52 and 53, secured to table 18. The deflectors 47 may be pivoted to cross bar 53 as indicated at 54, and be mounted for lateral adjustment in cross bar 52, as indicated by the bolt and slot connection 55. The deflectors may thus be spread apart near their intake ends to cover the entire width of conveyer 17 or be drawn together to cover only a portion thereof. The deflectors 25 and 25', as shown, leave only one row to be cared for by the end deflectors but, if the latter are to be used the deflectors 25 or 25' or both might be dispensed with. The deflector 25, for example, can be swung out of the way to allow a plurality of rows of candies to pass to the deflectors 47.

In many cases, the plaques used in candy boxes have a series of upstanding division walls, such as those shown at 56 in Fig. 8 in connection with the plaque 23'. In the particular example shown, the plaque is creased and folded to form the extensions 56 and for this reason the plaque does not readily lie in flat form. Consequently, there will be some difficulty in transferring the confections from conveyer 17 to plaque 23' unless some means are provided to hold the plaque 23' in flat contiguous relation with its support 48. For this purpose, I prefer to make the deflectors 47 with a substantially U-shaped cross section, thereby forming channels 57 in which the division walls 46 may be inserted. By making the channels 57 narrow enough so that the walls 56 closely fit therein, the folded portions forming the walls 56 will be held closely together, thereby preventing the intervening portions tilting with respect to support 48.

In operation, the confections, having been coated and the coatings having been cooled, are stripped from conveyer 15 and delivered to conveyer 17. The confections are thus free to move relatively to conveyer 17 and, when in their travel they engage the deflectors, they are automatically diverted toward the edge of the belt and upon a plaque. The operator does not have to pick up the pieces individually and the operation is much more rapidly accomplished than by methods heretofore in vogue. A number of rows of confections can be simultaneously diverted to a plaque, as shown at station C, or the confections may be diverted one row at a time, as shown at stations A and B, the operator sliding the deflector or the plaque supporting means, as the case may be, to assist in the operation, if desired. As soon as a plaque is loaded with confections, it is withdrawn from its support and placed upon a delivery conveyer, later to be placed by another operator in a box or, if desired, the operator may place the loaded plaque into the box and use the conveyer for transporting the filled boxes. The use of a plurality of plaque supporting means with a deflecting means and the provision for relative movement between these elements allows a loaded plaque to be moved out of and a fresh one moved into proper relation with the deflecting means with convenience and rapidity, enabling a quick shift to be made and avoiding any substantial interruption in the continuity of the packing operation.

The invention has been disclosed herein, in an embodiment at present preferred, for illustrative purposes but the scope of the invention is defined by the appended claims rather than by the foregoing description.

What I claim is:—

1. In combination, conveying means for confections and the like, supporting means adjacent thereto for plaques on which the candies are to be placed, deflecting means to divert confections on the conveying means toward said supporting means and assist the operator in arranging the confections on said plaques, said supporting and deflecting means being mounted for relative movement in a direction substantially parallel to that of the travel of said conveying means.

2. In combination, conveying means for confections and the like, a magazine for a stack of plaques and the like mounted so that the uppermost plaque in the stack lies substantially in the same plane as said conveying means and closely adjacent thereto, and deflecting means to assist in diverting confections from said conveying means to said uppermost plaque.

3. In combination, conveying means for confections and the like, a magazine adapted to contain a stack of plaques, means for supporting said magazine for sliding movement in a direction substantially parallel to the path of travel of said conveying means, and means for deflecting confections or the like to the uppermost plaque of the stack in said magazine.

4. In combination, conveying means for confections and the like, a plurality of magazines each adapted to contain a stack of plaques, means for supporting said magazines for sliding movement in a direction substantially parallel to the path of travel of said conveying means, means for deflecting confections or the like to the uppermost plaques of the stacks in said magazines, and a delivery conveyer adjacent said magazines and to which the loaded plaques in the latter may be transferred.

In testimony whereof I have affixed my signature.

ALONZO LINTON BAUSMAN.